US008154539B2

(12) United States Patent
Kawasaki et al.

(10) Patent No.: US 8,154,539 B2
(45) Date of Patent: *Apr. 10, 2012

(54) DRIVE CIRCUIT, DISPLAY APPARATUS USING DRIVE CIRCUIT, AND EVALUATION METHOD OF DRIVE CIRCUIT

(75) Inventors: Somei Kawasaki, Saitama (JP); Fujio Kawano, Kanagawa (JP); Masami Iseki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1071 days.

This patent is subject to a terminal disclaimer.

(21) Appl. No.: 12/042,459

(22) Filed: Mar. 5, 2008

(65) Prior Publication Data

US 2008/0158112 A1 Jul. 3, 2008

Related U.S. Application Data

(62) Division of application No. 10/790,738, filed on Mar. 3, 2004, now Pat. No. 7,532,207.

(30) Foreign Application Priority Data

Mar. 7, 2003 (JP) ................................. 2003-061288
Dec. 4, 2003 (JP) ................................. 2003-405642

(51) Int. Cl.
*G09G 5/00* (2006.01)
*G06F 3/038* (2006.01)

(52) U.S. Cl. .............. 345/204; 345/77; 345/78; 345/80; 345/211; 345/690; 315/169.3

(58) Field of Classification Search .................... 345/77, 345/78, 80, 204, 211, 690; 315/169.3
See application file for complete search history.

(56) References Cited

U.S. PATENT DOCUMENTS

| | | | | |
|---|---|---|---|---|
| 5,625,373 | A | 4/1997 | Johnson | 345/58 |
| 5,659,329 | A | 8/1997 | Yamanobe et al. | 345/74 |
| 5,751,279 | A | 5/1998 | Okumura | 345/212 |
| 6,091,203 | A | 7/2000 | Kawashima et al. | 315/169.3 |
| 6,195,076 | B1 | 2/2001 | Sakuragi et al. | 345/74 |
| 6,445,369 | B1 | 9/2002 | Yang et al. | 345/82 |
| 6,806,497 | B2 | 10/2004 | Jo | 257/59 |
| 7,113,156 | B2 | 9/2006 | Hashimoto | 345/77 |
| 7,532,207 | B2 * | 5/2009 | Kawasaki et al. | 345/204 |
| 2002/0030647 | A1 | 3/2002 | Hack et al. | 345/82 |
| 2002/0101395 | A1 | 8/2002 | Inukai | 345/83 |
| 2003/0122813 | A1 | 7/2003 | Ishizuki et al. | 345/211 |
| 2004/0108518 | A1 | 6/2004 | Jo | 257/200 |

(Continued)

FOREIGN PATENT DOCUMENTS

JP 60-002989 1/1985

(Continued)

*Primary Examiner* — Srilakshmi K Kumar

(74) *Attorney, Agent, or Firm* — Fitzpatrick, Cella, Harper & Scinto

(57) ABSTRACT

For making outputs of a drive circuits accurate, the drive circuit is composed of a plurality of current signal generation circuits for outputting a current signal to each of a plurality of output units, a current signal output line to which outputs of the plurality of current signal generation circuits are commonly connected, a correction value output circuit for outputting a correction value obtained by evaluating the output of one or more specific circuits of the plurality of current signal generation circuits on a basis of current values output through the current signal output line, and a correction circuit for correcting an image signal supplied to the current signal generation circuits by means of the correction value.

2 Claims, 9 Drawing Sheets

U.S. PATENT DOCUMENTS

| | | | | |
|---|---|---|---|---|
| 2006/0152453 | A1 | 7/2006 | Hashimoto | 345/77 |
| 2008/0157828 | A1* | 7/2008 | Kawasaki et al. | 327/108 |

FOREIGN PATENT DOCUMENTS

| | | |
|---|---|---|
| JP | 4-142591 | 5/1992 |
| JP | 6-035414 | 2/1994 |
| JP | 6-35414 | 2/1994 |
| JP | 10-503292 | 3/1998 |
| JP | 11-282419 | 10/1999 |
| JP | 11-282420 | 10/1999 |
| JP | 11-338413 | 12/1999 |
| JP | 11-338561 | 12/1999 |
| JP | 2000-180809 | 6/2000 |
| JP | 2002-91377 | 3/2002 |
| JP | 2002-278513 | 9/2002 |
| JP | 2002-312523 | 10/2002 |
| JP | 2003-66865 | 3/2003 |
| JP | 2003-295828 | 10/2003 |
| JP | 2004-004673 | 1/2004 |
| JP | 2004-004675 | 1/2004 |
| JP | 2004-145197 | 5/2004 |
| WO | WO 96/02908 | 2/1996 |
| WO | WO 97/44774 | 11/1997 |
| WO | WO 01/27910 | 4/2001 |
| WO | WO 02/39420 | 5/2002 |

* cited by examiner

[1] 0.6250 [5] 1.0000
[2] 0.7500 [6] 1.1250
[3] 0.8750 [7] 1.2500
[4] 0.9375 [8] 1.3750

PRIOR ART

DRIVE CIRCUIT, DISPLAY APPARATUS USING DRIVE CIRCUIT, AND EVALUATION METHOD OF DRIVE CIRCUIT

This is a divisional of application Ser. No. 10/790,738, filed on Mar. 3, 2004.

BACKGROUND OF THE INVENTION

1. Field of the Invention

The present invention relates to a drive circuit for outputting a current signal, and further relates to a display apparatus using the drive circuit.

2. Related Background Art

A display apparatus of an active matrix system using organic electroluminescent (EL) elements can light individual pixels at higher gradation in comparison with a conventional display apparatus of a simple matrix system in which light emission is controlled by performing only turning on or off operations of electrodes arranged in a lattice. Consequently, by the display apparatus adopting the active matrix system, a display having a large contrast ratio and a high response speed can be realized.

The EL display apparatus includes an image display unit arranging pixels therein, and a drive circuit for processing signal information of an image signal and the like input from the outside to transmit the processed signal information to each pixel in the image display unit. In the drive circuit, a drive control circuit to be built in the same display panel as that of the image display unit is normally configured to use a thin film transistor (TFT). Moreover, the TFT's are mainly used also as active elements for controlling light emitting states of the EL element at each pixel. However, TFT elements disperse in a large scale in their characteristics in comparison with complementary metal-oxide semiconductor (CMOS) transistors, and it is difficult to ensure the correlativity of the dispersion even in adjacent areas. Consequently, when circuits are not designed so as to control drive states surely, nonuniformity in luminance is generated even if it is tried that all of the pixels emit light uniformly.

Japanese Patent Application Laid-Open No. 2003-66865 discloses a configuration of a pixel circuit for reducing the variations of current values stored in the pixel circuit by configuring the pixel circuit using four TFT's to be controlled with a plurality of gate lines and a source line for suppressing the influences of kink currents of the transistors without adopting the source follower configuration of the transistors for controlling the currents flowing through an EL element.

A circuit disclosed in Japanese Patent Application Laid-Open No. 2002-91377, as shown in FIG. 13, includes a current detection circuit 105 for detecting a current flowing through an organic EL element 103, and an error amplification circuit 102 for amplifying a difference between an output voltage of the current detection circuit 105 and an output voltage of a sample hold circuit 101 to input the amplified difference into a current control circuit 104 in a pixel circuit. The circuit is configured to make the output voltage of the current detection circuit 105 and the output voltage of the sample hold circuit 101 equal by a negative feedback operation. Thereby, the circuit controls luminance to be uniform.

Japanese Patent Application Laid-Open No. 2002-278513 discloses a configuration shown in FIG. 14. In the configuration, current detection circuits are not provided in every pixel, but a current measurement element 110 is provided to each supply line of an power source 108. The current measurement elements 110 measure the currents of a certain row according to a control state of a scanning driver 111, and after that the measured currents are stored in storage means 109. Then, the stored currents are calculated by an arithmetic element 107 and an external data driver 106, and after that the calculated currents are fed back to image data.

As display elements, various elements are known in addition to the EL element. U.S. Pat. No. 6,195,076 discloses a configuration for driving electron emission elements by a current signal.

SUMMARY OF THE INVENTION

It is an object of the present invention to realize a simple configuration capable of evaluating an output of a drive circuit. In particular, a concrete object is to realize a configuration capable of evaluating an output of a drive circuit without providing a measurement element for evaluating outputs to every plurality of output units of driving circuits, and without providing an individual output line for taking out each output to every plurality of output units of a driving circuit.

A main point of the present invention is to simplify the configuration of guiding a plurality of outputs to a circuit for evaluating the outputs by the use of an output line to which the plurality of outputs is commonly connected. However, the configuration has peculiar problems. That is, a peculiar problem to be generated is that, when the signals output from the drive circuit are signals the voltage values of which are controlled (voltage signals), the connection of a plurality of outputs different from one another to the common output line makes it impossible to perform accurate evaluation. This is a first peculiar problem. Accordingly, the present invention uses the output line to which the plurality of outputs are commonly connected, and adopts a configuration in which a plurality of current signal generation circuits for outputting current signals (namely, signals the current values of which are controlled) as the outputs for solving the first problem. Moreover, there is a second peculiar problem. Even when the configuration using the output line, to which the plurality of outputs are connected, as an output line for evaluating the outputs and the current signal generation circuits for outputting current signals (namely, signals the current values of which are controlled) as the outputs for solving the first peculiar problem accompanying the common output line is adopted, it is impossible to specify which one of the plurality of current signal generation circuits is the current signal generation circuit to be evaluated (the second peculiar problem). Accordingly, the present invention is further provided with a control circuit for controlling each of the plurality of current signal generation circuits to a current signal output state in which the output of a specific one of the current signal generation circuits can be evaluated on the basis of current value outputs from the current signal output line for the solving of the second peculiar problem also together with the solving of the first peculiar problem.

A first invention of the present application is configured as follows.

That is, a drive circuit characterized by:

a plurality of current signal generation circuits for outputting a current signal to each of a plurality of output units;

a current signal output line to which outputs of the plurality of current signal generation circuits are commonly connected;

a control circuit for controlling each of the plurality of current signal generation circuits to be a current signal output state capable of evaluating an output of one or more specific circuits of the plurality of current signal generation circuits on a basis of current values output through the current signal output line;

a correction value output circuit for evaluating the output of the one or more specific circuits of the plurality of current signal generation circuits on a basis of the current values output through the current signal output line to output a correction value according to an evaluation result; and a correction circuit for correcting an image signal supplied to the current signal generation circuits by means of the correction value.

Hereupon, a configuration in which the control circuit supplies a predetermined signal to the one or more specific circuits of the current signal generation circuits, and supplies a signal different from the predetermined signal to the other current signal generation circuits commonly can be suitably adopted. For example, a first current signal generation circuit, one of the plurality of current signal generation circuits, is set to be the specific current signal generation circuit. Then, the predetermined signal is supplied to the first current signal generation circuit, and the different common signal is supplied to the other current signal generation circuits. A result obtained at this time is set to be a first result. Next, a second current signal generation circuit different from the first current signal generation circuit is set to be the specific current signal generation circuit. Then, the predetermined signal is supplied to the second current signal generation circuit, and the common signal is supplied to the other current signal generation circuits. A result obtained at this time is set to be a second result. By comparing the first result and the second result, it becomes possible to compare and evaluate the first current signal generation circuit and the second current signal generation circuit.

Moreover, the evaluation of an output of a current signal generation circuit hereupon means to detect a value of an output of the current signal generation circuit, a difference from an output of another current signal generation circuit, a difference from a predetermined reference value, and the like directly or indirectly.

Moreover, in particular, the following configuration can be suitably adopted. That is, the control circuit supplies the predetermined signal to the one or more of the current signal generation circuits, and supplies the signal different from the predetermined signal to the other or others of the current signal generation circuits, wherein the different signal is a signal such that a current value of a current signal output from each of the other current signal generation circuits, to which the different signal has been supplied, is sufficiently smaller than a current value of the current signal output from the one or more of the current signal generation circuits. By this configuration, the outputs from the current signal generation circuits other than the one or more current signal generation circuit to be evaluated can be neglected. Moreover, even if the outputs of the other current signal generation circuits cannot be neglected, the calculation for processing the outputs as backgrounds becomes easy, and the accuracy of the calculation can be heightened.

Moreover, in each invention described above, a configuration further including a switch for realizing a state in which the current signal output line is connected to the plurality of current signal generation circuits simultaneously can be suitably adopted. A configuration in which the switch is a switch group composed of a plurality of switches provided correspondingly to the plurality of current signal generation circuits can be suitably adopted. A configuration in which the current signals output by the current signal generation circuits are made to flow to the current signal output line on the way of current routes between the current signal generation circuits and display elements to which the current signals output by the current signal generation circuits are supplied can be suitably adopted. In the configuration, when the execution of the evaluation of the outputs of the current signal generation circuits is not needed, the current signal generation circuits and the current signal output line are preferably in an unconnected state from each other. The switches are preferably arranged in order that the unconnected state can be realized. Incidentally, the present invention uses the control circuit for controlling each of the plural current signal generation circuits to a current signal output state in which an output of the specific one of the current signal generation circuits can be evaluated on the basis of the current values output from the current signal output line. Consequently, the switch is not needed to be one which can individually control the connection relation between individual current signal generation circuits and the current signal output line. Even when individual switches are provided between individual current signal generation circuits and the current signal line, those switches can be controlled by a common control signal.

Moreover, in each invention described above, a configuration including a plurality of switches for severally controlling connection relations between the plurality of current signal generation circuits and the current signal output line, which switches are controlled by a common control signal, can be suitably adopted.

Moreover, in each invention described above, a configuration including a plurality of switches for severally controlling connection relations between the plurality of current signal generation circuits and the plurality of output units, which switches are controlled by a common control signal, can be suitably adopted. As described above, the configuration in which the current signals output by the current signal generation circuits are made to flow to the current signal output line on the way of the current routes between the current signal generation circuits and the display elements to which the current signals output from the current signal generation circuits are supplied can be suitably adopted. When evaluation is performed by guiding the outputs of the current signal generation circuits to the current signal output line, a configuration in which the outputs of the current signal generation circuits do not split to the display element side is preferable. By providing the switches between the data lines to which the display elements are connected and the current signal generation circuits, it can be suppressed that the current signals to be evaluated split to the data line side.

Incidentally, in the present invention, the expressions such as the outputs of the current signals are used. These expressions do not limit the configuration to one in which the currents are made to flow specific directions. For example, in case of an expression which expresses that the current signal generation circuits output current signals, the expression includes both of the case where the currents to be the current signals flow out from the current signal generation circuits and the case where the currents flow into the current signal generation circuits.

Moreover, in each invention described above, the following configuration can be suitably adopted. That is, the drive circuit is a drive circuit for driving a display apparatus including display elements, and the display apparatus includes at least a part of the display elements formed on a substrate on which the current signal generation circuits and the current signal output line are formed.

Moreover, in each invention described above, the following configuration can be suitably adopted. That is, each of the current signal generation circuits includes at least a circuit for outputting a current signal having a squared current value of a current value of an input signal, and the correction value output circuit outputs a correction value obtained by calculating a square root of a ratio between an output evaluation value of the specific one of the current signal generation circuits obtained by the evaluation and a reference value. In particular, the following configuration can be suitably adopted. That is, the correction value output circuit includes a calculation circuit for calculating the square root, and the calculation is an approximation calculation performed by classifying according to a value of the ratio between the output evaluation value and the reference value.

Moreover, the present invention includes an invention of a display apparatus characterized by: a drive circuit according to each of the inventions described above; a plurality of data lines connected to the plurality of output portions of the drive circuit severally; and a plurality of display elements connected to the plurality of data lines severally, as an invention of a display apparatus.

As the display apparatus, one in which a plurality of the display elements is arranged in a matrix can be suitably used. In this case, the following configuration can be suitably adopted. That is, the plurality of data lines is used as a plurality of modulation signal lines, and in addition, a plurality of scanning lines constituting matrix wiring together with the plurality of modulation signal liens is provided. Furthermore, the plurality of the display elements arranged in the matrix is driven by means of the matrix wiring. In this case, a scanning circuit for selecting the scanning lines in order may be provided.

Incidentally, the current signal generation circuits, the current signal output line and the switches of the drive circuit can be arrange on a substrate on which at least a part of the display elements are formed. In this case, especially the data lines to which the display elements are connected and the output units of the drive circuit are not required to take a form of connecting the data lines to which the display elements are connected with the output units of the drive circuit with special connection elements. In this case, arbitrary positions between the portions at which the display elements of the data lines are connected and the circuits constituting the drive circuit become the output units.

Incidentally, as the display elements in the present invention, various elements capable of being driven by current signals can be used. For example, the EL elements can be especially preferably used as the display elements. In addition to the EL elements, for example, electron emission elements can be used as the display elements. When the electron emission elements are used as the display elements, display can be performed by using luminous elements such as phosphors, which emit light by the emitted electrons, in combination with the electron emission elements.

Moreover, the present application includes the following invention as an invention of an evaluation method of a drive circuit.

That is, an evaluation method of a drive circuit including a plurality of current signal generation circuits for outputting current signals to each of a plurality of output units, characterized by the steps of:

connecting outputs of the plurality of current signal generation circuits to a common current signal output line;

controlling each of the plurality of current signal generation circuits to a current signal output state in which an output of a specific one of the current signal generation circuits can be evaluated on a basis of current values output through the current single output line; and evaluating an output of the specific one of the current signal generation circuits on a basis of the current values output through the current single output line.

DESCRIPTION OF THE PREFERRED EMBODIMENTS (Embodiment 1)

Figure 1:
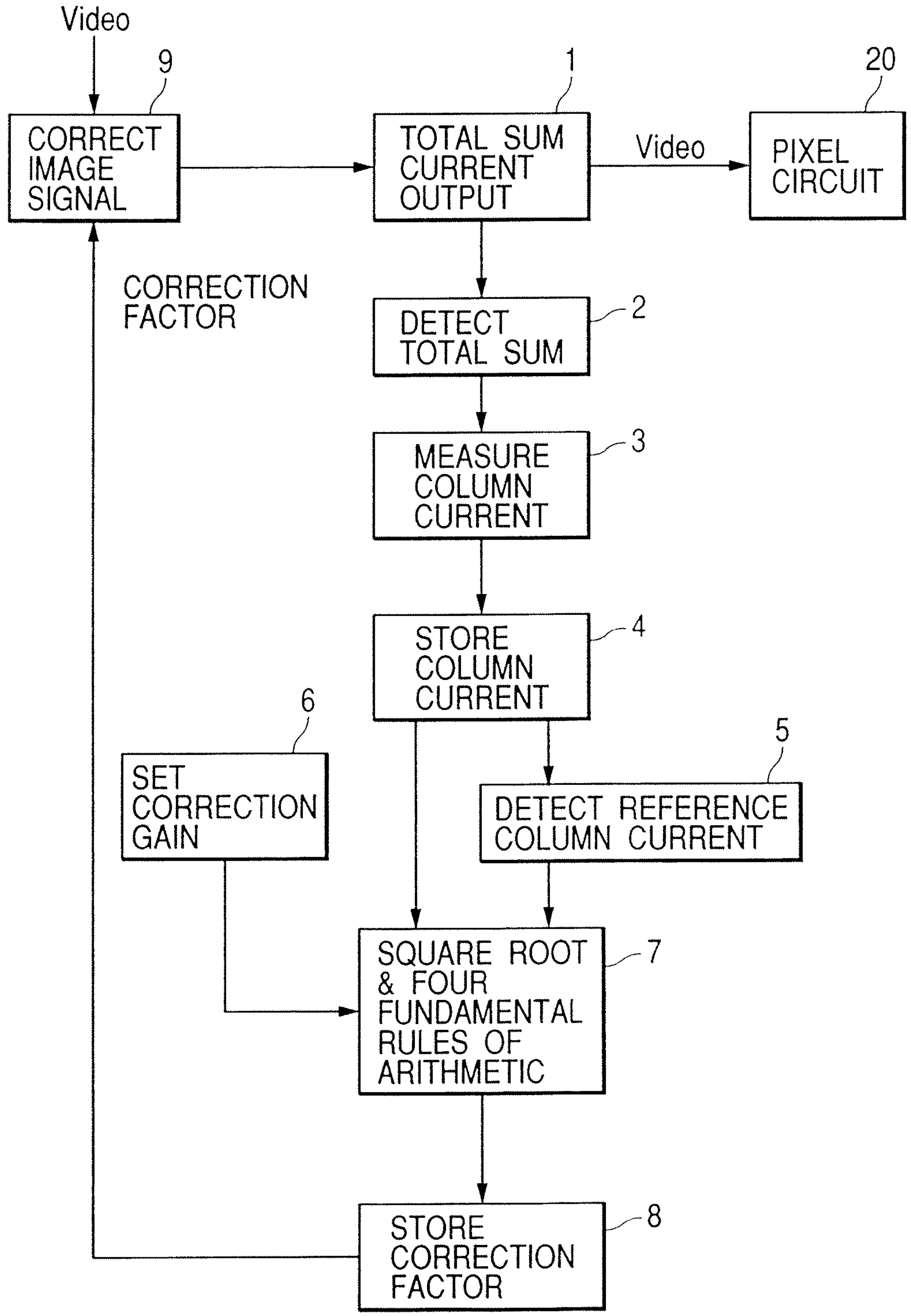
FIG. 1 is a block diagram showing the configuration of correction routs of a drive circuit of the present invention.

FIG. 1 is a block diagram showing the configuration of correction routes of a drive circuit of a preferable embodiment of the present invention. In FIG. 1, a reference numeral 1 designates a drive control circuit. A reference numeral 2 designates a total sum current detection circuit. A reference numeral 3 designates a column current measurement circuit. A reference numeral 4 designates a column current storage circuit. A reference numeral 5 designates a reference column current detection circuit. A reference numeral 6 designates a correction gain determination circuit. A reference numeral 7 designates a correction factor calculation circuit. A reference numeral 8 designates a correction factor storage circuit. A reference numeral 9 designates an image signal correction circuit. A reference numeral 20 designates a pixel circuit.

The drive circuit of the present embodiment is provided with a total sum current output circuit (included in the drive control circuit 1 in FIG. 1) between a column control circuit and the pixel circuit 20. A current signal output from the column control circuit is output from the total sum current output circuit as a total sum current. The output total sum current is detected by the total sum current detection circuit 2. The column current measurement circuit 3 measures current signal data at each data line, and the measured current signal data is stored in the column current storage circuit 4. Next, the reference column current detection circuit selects the current signal data to be a reference from the column current storage circuit 4. The correction factor calculation circuit 7 performs calculation processing of the reference current signal data and the current signal data on each data line stored in the column current storage circuit 4 to obtain correction factors. The obtained correction factors are stored in the correction factor storage circuit 8. In response to a new image signal, the image signal correction circuit 9 corrects the data of each pixel included in the image signal by means of the correction factor of the corresponding data line stored in the correction factor storage circuit 8. The corrected image signal obtained by the image signal correction circuit 9 is transmitted to the drive control circuit 1 again to be transmitted to the pixel circuit 20 through data lines.

In the present embodiment, correction routes from the outputting of the total sum current by the drive control circuit 1 to the inputting of the corrected image signal to the drive control circuit 1 are provided. By means of the correction routs, the dispersion of the current signals output from the column control circuit is corrected.

Figure 2:
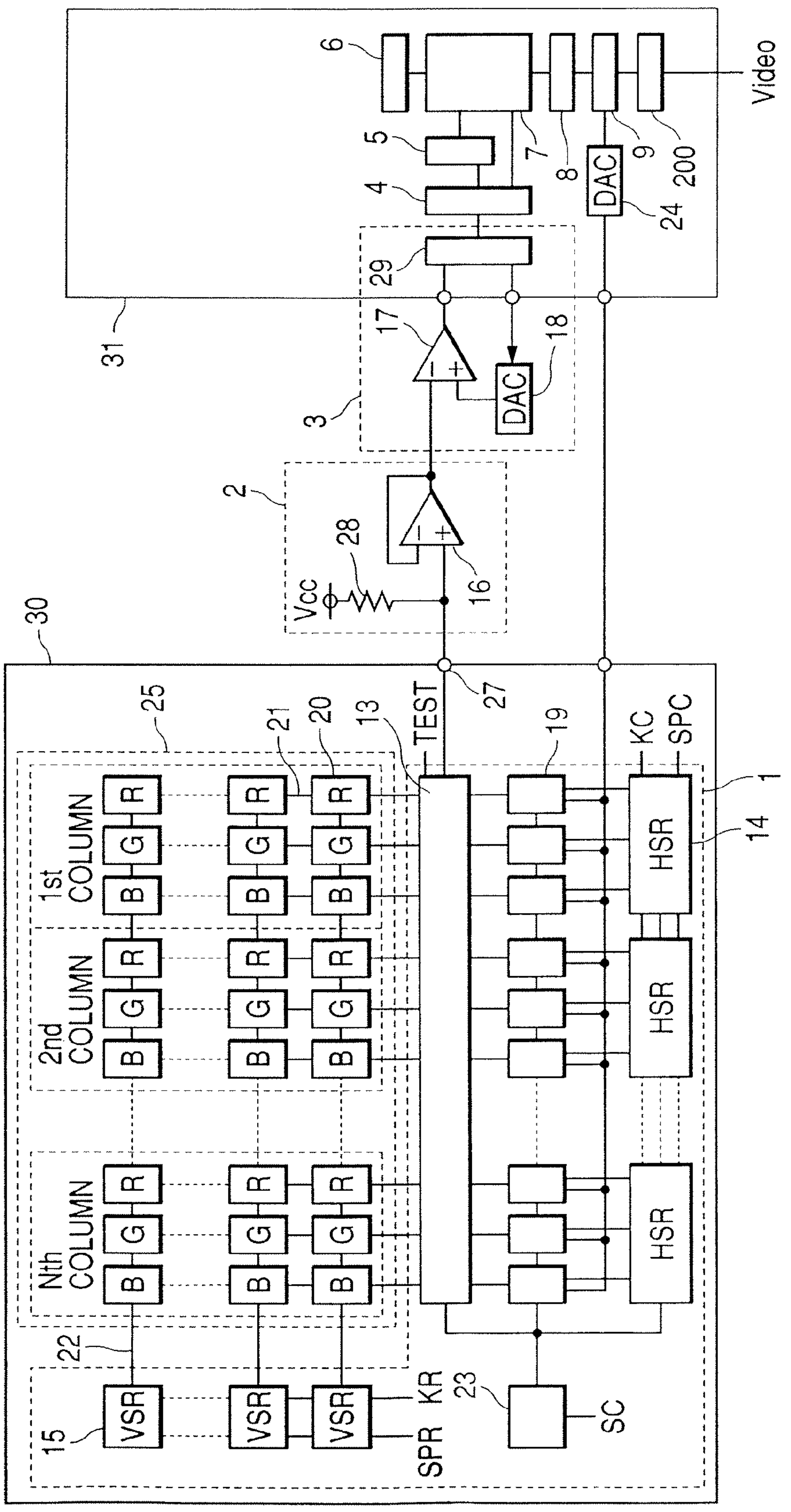
FIG. 2 is a schematic diagram showing the configuration of one preferable embodiment of the display apparatus of the present invention.

FIG. 2 is a schematic view showing the configuration of one preferable embodiment of the display apparatus of the present invention. Incidentally, in FIG. 2, only the members necessary for understanding the present embodiment are shown In FIG. 2, a reference numeral 13 designates a total sum current output circuit. A reference numeral 14 designates a column shift register (HSR). A reference numeral 15 designates a row shift register (VSR). A reference numeral 16 designates an operational amplifier. A reference numeral 17 designates a comparator. A reference numeral 18 designates a digital to analog converter (DAC). A reference numeral 19 designates a column control circuit. A reference numeral 21 designates a data line. A reference numeral 22 designates a scanning line. A reference numeral 23 designates a logic circuit. A reference numeral 24 designates a DAC. A reference numeral 25 designates a image display unit. A reference numeral 27 designates a total sum current output terminal (Iout). A reference numeral 28 designates a detection resistor (Rm). A reference numeral 29 designates a comparison circuit. A reference numeral 30 designates a display panel. A reference numeral 31 designates an external control circuit. The same members as those shown in FIG. 1 are designated by the same reference numerals.

The display apparatus of the present embodiment includes the display panel 30 and a drive circuit. The drive circuit is provided with necessary circuits such as the drive control circuit 1 on the display panel 30, the external control circuit 31 on the outside of the display panel 30, and the total sum current detection circuit 2 and a part of the column current measurement circuit 3 between the external control circuit 31 and the display panel 30.

In the display panel 30, the drive control circuit 1 and the image display unit 25 driven by the drive control circuit 1 are arranged. The image display unit 25 of the present embodiment is composed of N columns and M rows of display units. The display units are severally composed of three pixel circuits 20 arranged in a row direction for displaying red (R), green (G) and blue (B), as the minimum display units, each pixel circuit 20 including active elements. Consequently, the number of the columns of the pixels is (N×3). M×N×3 of the pixel circuits 20 are arranged in a matrix. The pixel circuits 20 of each row are commonly connected to a scanning line 22. Each scanning line 22 is connected with one of the row shift registers 15 constituting a scanning circuit. Moreover, the pixel circuits 20 in each column are commonly connected to a data line 21. Each data line 21 is connected to one of the column control circuits 19 through the total sum current output circuit 13. In the present embodiment, EL elements are used as display elements. Each of the pixel circuits 20 includes one of the EL elements.

In the display apparatus of FIG. 2, when a column scanning clock KC and a column scanning start signal SPC are input into a column shift register 14 at a first step, a sampling signal to be generated by transiting at every one period or at every half period of the column scanning clock KC is output from each shift register 14 to be input into the corresponding column control circuit 19. Into the column control circuits 19, a column control signal SC is input through the logic circuit 23. In each control circuit 19, an image signal Video for a predetermined period is sampled by means of the above-mentioned sampling single and the column control signal SC, and a corresponding current signal is output onto the corresponding data line 21.

Moreover, when a row scanning clock KR and a row scanning start signal SPR are input into a shift register 15 at a first step, a sampling signal to be generated by transiting at every one period or at every half period of the row scanning clock KR is input into the pixel circuits 20 at each row through each of the scanning lines 22 in order.

Figure 3:
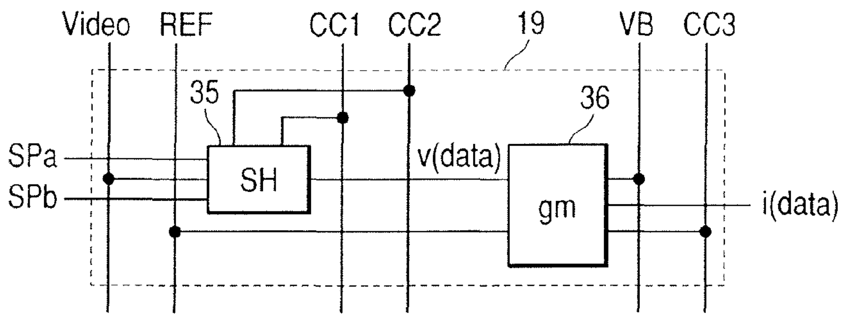
FIG. 3 is a diagram showing a circuit configuration of a column control circuit.

In the present invention, each of the column control circuits 19 includes a current signal generation circuit. FIG. 3 shows an analog column control circuit having a simple structure as an example of the circuit configurations of the column control circuits 19. In FIG. 3, a reference numeral 35 designates a sample hold circuit. A reference numeral 36 designates a current signal generation circuit. In particular, the individual current signal generation circuit is a voltage-current conversion circuit for receiving a voltage signal and outputting a signal (current signal) having a current value according to the voltage value. Moreover, reference marks SPa and SPb designate sampling signals output from a shift register 14. Reference marks CC1, CC2 and CC3 designate column control signals SC output from the logic circuit 23. A reference marks VB designates a reference voltage bias signal. A reference mark REF designates a reference signal input with a correlation with the image signal Video.

The image signal Video input into the sample hold circuit 35 in FIG. 3 is an image voltage signal of a corresponding color. The sampling signals SPa and SPb output from the shift register 14 are input into the sample hold circuit 35. Moreover, the column control signals CC1 and CC2 are also input into the sample hold circuit 35. A voltage signal v(data) output from the sample hold circuit 35, the reference voltage bias signal VB, the column control signal CC3 and the reference signal REF are severally input into the voltage-current conversion circuit 36, and a current signal i(data) is output from the voltage-current conversion circuit 36.

The operation of the circuit of FIG. 3 will be described by using a time chart shown in FIG. 4.

In a period T1 being a row period (horizontal scanning period), the column control signal CC1 becomes "L" (the column control signal CC2 becomes "H"), and the sampling signals SPa are output (the sampling signals SPb are not output). In a generation period t1 of the sampling signal SPa of the corresponding column, a difference voltage d1 between voltages of the image signal Video and the reference signal REF is sampled to be the voltage signal v(data), and held in the sample hold circuit 35.

In the next period T2, when the column control signal CC1 turns to "H" (the column control signal CC2 turns to "L"), the voltage signal v(data) which has been sampled and held during the period T1, is input into the current signal generation circuit 36, and converted into the current signal i(data). The converted current signal i(data) is output from the current signal generation circuit 36 as a current i(m). Moreover, in the period T2, the sampling signals Sb are output. In a generation period t2 of the sampling signal SPb of the corresponding column, a difference voltage d2 between the voltages of the image signal Video and the reference signal REF is sampled to be the voltage signal v(data), and held in the sample hold circuit 35.

Successively, in a period T3, the column control signal CC1 turns to “L” again (the column control signal CC2 turns to “H”), and the voltage signal v(data) sampled and held in the period T2 is input into the current signal generation circuit 36. Then, the converted current i(data) is output.

Figure 5:
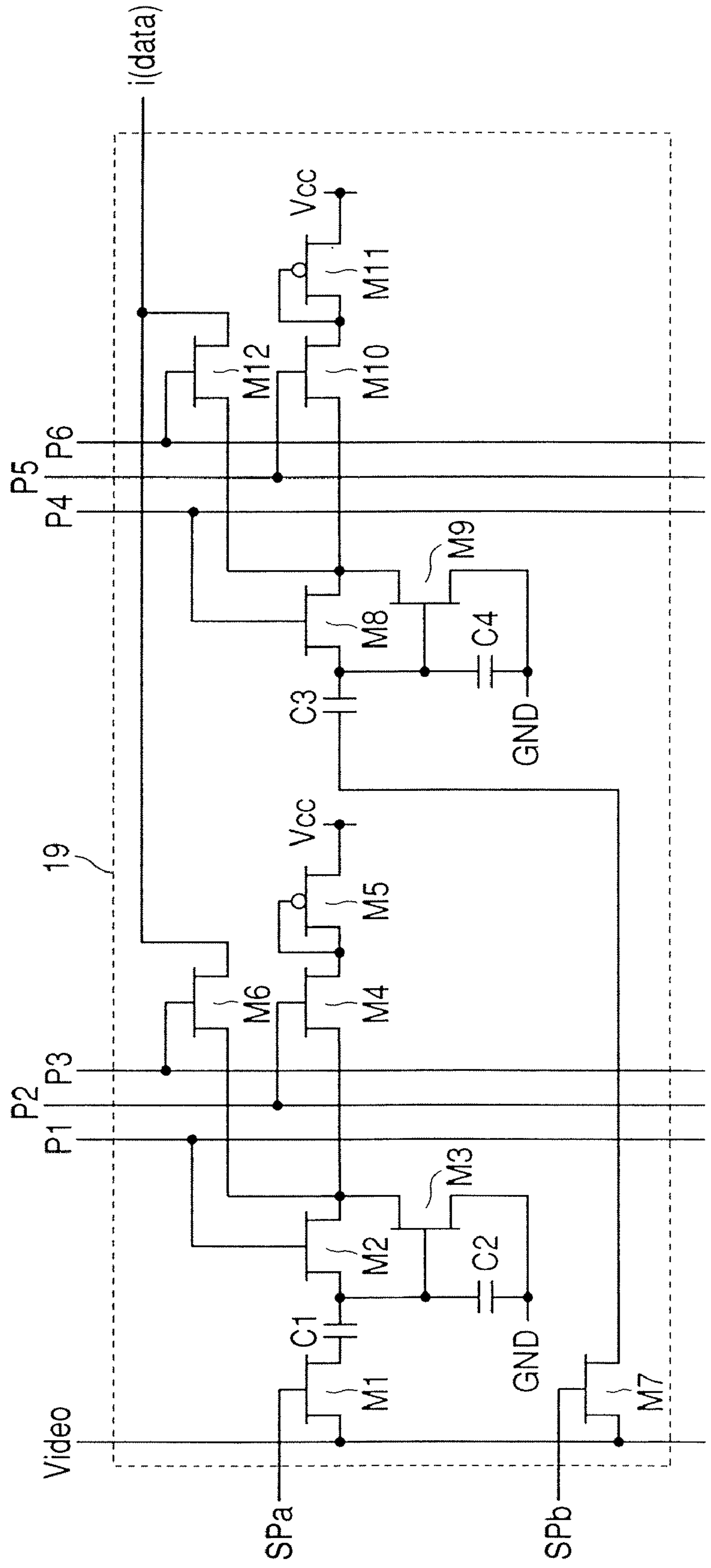
FIG. 5 is a diagram showing another circuit configuration of the column control circuit.

FIG. 5 shows another circuit configuration example of the column control circuit 19. In FIG. 5, reference marks M1 to M4, M6 to M10 and M12 severally designate an n-type TFT. Reference marks M5 and M11 severally designate a p-type TFT. Reference marks C1 to C4 severally designate capacity. The reference marks SPa and SPb designate the sampling signals. A reference mark Vcc designates a power source voltage. Reference marks P1 to P6 designate column control signals. In the following, a source, a drain and a gate of a transistor will be referred to as /S, /D and /G, respectively.

In the circuit shown in FIG. 5, an image signal Video is input into an M1/S and an M7/S. The sampling signals SPa and SPb are input into an M1/G and an M7/G, respectively. An M1/D is connected to one end of the capacity C1, and the other end of the capacity C1 is connected to one end of the capacity C2, the other end of which is grounded, and an M3/G. An M3/S is grounded. An M3/D and the M3/G are connected an M2/D and an M2/S, respectively. Into an M2/G the column control signal P1 is input. The M3/D is connected to an M4/S. An M4/D is connected to an M5/D. An M5/S is connected to the power source voltage Vcc. The M5/D and an M5/G are shorted. Into an M4/G, the column control signal P2 is input. Moreover, an M6/S is connected to the M3/D. An M6/D is connected to a terminal of the current signal i(data). Into an M6/G, the column control signal P3 is input.

On the other hand, an M7/D is connected to one end of the capacity C3, and the other end of the capacity C3 is connected to one end of the capacity C4, the other end of which is grounded, and an M9/G. An M9/S is grounded. An M9/D and the M9/G are connected to an M8/D and an M8/S, respectively. Into an M8/G, the column control signal P4 is input. The M9/D is connected to an M10/S. An M10/D is connected to an M11/D. An M11/S is connected to the power source voltage Vcc. The M11/D and an M11/G are shortened. Into an M10/G, the column control signal P5 is input. Moreover, the M9/D is connected to an M12/S. An M12/D is connected to the terminal of the current signal i(data). Into an M12/G, the column control signal P6 is input. Moreover, the gate sizes (the width W and the length L) and the capacity of each transistor are in the following relations: M1=M7, M2=M8, M3=M9, M4=M10, M5=M11, M6=M12, C1=C3 and C2=C4.

Figure 6:
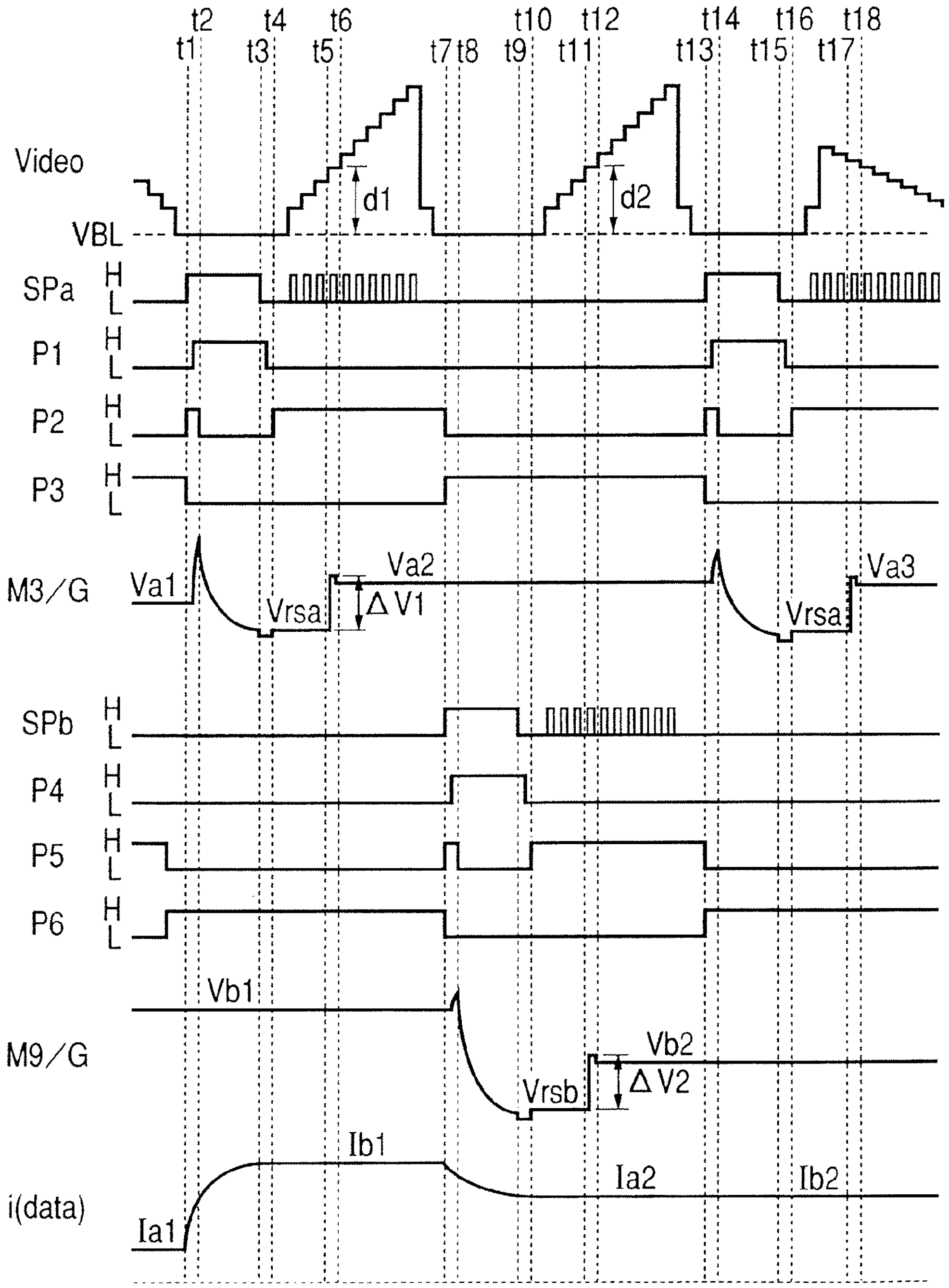
FIG. 6 is a time chart of the column control circuit of FIG. 5.

A time chart of the operation of the circuit of FIG. 5 is shown in FIG. 6. In FIG. 6, reference marks M3/G and M9/G designate the gate voltages of the TFT's M3 and M9, respectively. FIG. 6 shows the operation pertaining to an image signal for two rows.

(Immediately Before a Time t1)

SPa=L, SPb=L,

P1=L, P2=L, P3=H, P4=L, P5=H, and P6=L.

Consequently, each transistor is in the state of:

M1: off, M2: off, M4: off, M6: on, M7: off, M8: off, M10: on, and M12: off.

At this time, the transistors M3 and M9 are driven to make currents flow by holding voltages Va1 and Vb1 charged in the capacity accompanying the gates of the transistors M3 and M9, respectively, and a current Ia1 of the M3/D is output as the current signal i(data). A current of the M9/D is supplied to the M11/D and the M11/G and becomes a fixed value.

(Time t1)

The sampling signals SPa and the column control signals P2, P3, P5 and P6 change as follows.

SPa=H, P2=H, P3=L, P5=L and P6=H.

The image signal Video becomes a blanking signal VBL in a blanking period.

Consequently, each transistor becomes as follows:

M1: on, M2: off, M4: on, M6: off, M7: off, M8: off, M10: off, M12: on.

At this time, a current Ib1 of the M9/D driven by the voltage Vb1 of the M9/G is output as the current signal i(data) in place of the current Ia1 of the M3/D. The current signal i(data) passes through the column length of the image display unit 25, and is connected to the EL elements corresponding to many pixel circuits 20 of each column. Consequently, the current signal i(data) must drive large parasitic capacity. Hence, an active current supply transition Ia1→Ib1 takes a lot of time. Before a time t2, the column control signal P1 becomes “H”, and the transistor M2 turns on. For a short period of time from this point of time to the time t2, the M3/G is charged by the transistor M5.

(Time t2)

The column control signal P2 changes to “L”, and the transistor M4 turns off. Consequently, the charging operation of the M3/G by the transistor M5 is stopped. The M3/G performs a self discharge operation so as to approach to a threshold voltage Vth of the M3/G itself gradually.

(Time t3)

The sampling signal SPa changes to “L”, and the transistor M1 turns off. The column control signal P1 changes to “L” before a time t4, and the transistor M2 turns off. At this point of time, the self discharge operation of the transistor M3 is terminated. For a period from this point of time to the time t4, both of the transistors M2 and M4 are off, and the current of the M3/D rapidly changes to the L level. Consequently, the voltage of the M3/G falls by a little degree owing to drain-gate capacity and the like as shown in FIG. 6.

(Time t4)

The column control signal P2 changes to “H”, and the transistor M4 turns on. Consequently, the current of M3/D rises again, and the voltage of the M3/G rises again to return to almost the original state (Vrsa). At this point of time, the voltage of the M3/G is near to the threshold voltage Vth of itself, and consequently the voltage of the M3/D is almost zero.

(Up to Time t7)

During a period from the time t4 to a time t7, a sampling signal SPa corresponding to each column is generated. Any sampling signals SPb are not generated. During the period from a time t5 to a time t6, a sampling signal SPa of the corresponding pixel column is generated to change the voltage of the M3/G held near to the threshold voltage Vth of itself by a transition voltage ΔV1 owing to the video signal level d1 based on the blanking level (VBL) taken as a reference at this point of time. The transition voltage ΔV1 is schematically shown by the following formula.

$$\Delta V1 = d1 \times C1/(C1 + C2 + C(M3))$$

where C(M3) designates the input capacity of the M3/G.

When the corresponding sampling signal SPa changes to “L”, the transistor M1 turns off, and the voltage of the M3/G changes to a voltage Va2 falling from the transition voltage ΔV1 by a little owing to the parasitic capacity operation of the transistor M1, and enters the held state again.

(Time t7)

The sampling signal SPb and the column control signals P2, P3, P5 and P6 change as follows.

SPb=H, P2=L, P3=H, P5=H and P6=L.

The image signal Video becomes a blanking signal VBL in a blanking period.

Consequently, each transistor becomes as follows:

M1: off, M2: off, M4: off, M6: on, M7: on, M8: off, M10: on, M12: off.

At this time, a current Ia2 of the M3/D driven by the voltage Va2 of the M3/G is output as the current signal i(data) in place of the current Ib1 of the M9/D. The current signal i(data) passes through the column length of the image display unit 25, and connected to the EL elements corresponding to many pixel circuits 20 of each column. Consequently, the current signal i(data) must drive the large parasitic capacity. Hence, an active current supply transition Ib1→Ia2 takes a lot of time. Before a time t8, the column control signal P4 becomes "H", and the transistor M8 turns on. For a short period of time from this point of time to the time t8, the M9/G is charged by the transistor M11.

(Time t8)

The column control signal P5 changes to "L", and the transistor M10 turns off. Consequently, the charging operation of the M9/G by the transistor M11 is stopped. The M9/G performs a self discharge operation so as to approach to a threshold voltage Vth of the M9/G itself gradually.

(Time t9)

The sampling signal SPb changes to "L", and the transistor M7 turns off. The column control signal P4 changes to "L" before a time t10, and the transistor M8 turns off. At this point of time, the self discharge operation of the transistor M9 is terminated. For a period from this point of time to the time t10, both of the transistors M8 and M10 are off, and the current of the M9/D rapidly changes to the L level. Consequently, the voltage of the M9/G falls by a little degree owing to drain-gate capacity and the like as shown in FIG. 6.

(Time t10)

The column control signal P5 changes to "H", and the transistor M10 turns on. Consequently, the current of M9/D rises again, and the voltage of the M9/G rises again to return to almost the original state (Vrsb). At this point of time, the voltage of the M9/G is near to the threshold voltage Vth of itself, and consequently the voltage of the M9/D is almost zero.

(Up to Time t13)

During a period from the time t10 to a time t13, a sampling signal SPb corresponding to each column is generated. Any sampling signals SPa are not generated. During the period from a time t11 to a time t12, a sampling signal SPb of the corresponding pixel column is generated to change the voltage of the M9/G held near to the threshold voltage Vth of itself by a transition voltage ΔV2 owing to the video signal level d2 based on the blanking level (VBL) taken as a reference at this point of time. The transition voltage ΔV2 is schematically shown by the following formula.

$$\Delta V2 = d2 \times C3/(C3 + C4 + C(M9))$$

where C(M9) designates the input capacity of the M9/G.

When the corresponding sampling signal SPb changes to "L", the transistor M7 turns off, and the voltage of the M9/G changes to a voltage Vb2 falling from the transition voltage ΔV2 by a little owing to the parasitic capacity operation of the transistor M7, and enters the held state again. Moreover, the image signal Video returns to the blanking level VBL immediately before the time t13.

After that, the operation during the period from the time 1 to the time t12 is repeated by setting the time t13 as the time t1.

In the circuit shown in FIG. 5, the capacity C2 and C4 may be realized only by the gate input capacity (channel capacity) of the transistors M3 and M9. In this case, the capacity C2 and 4 may be not provided. Moreover, in FIG. 6, the changing timing of the column control signals P1 and P2 may be set at the time t1 and the time t3, respectively, to be the same as those of the sampling signal SPa. Moreover, the changing timing of the column control signals P4 and P5 may be set at the time t7 and the time t9, respectively, to be the same as those of the sampling signal SPb. In FIG. 5, the column control signal P2, the transistors M4 and M5, and the column control signal P5, the transistors M10 and M11 constituting the bias circuits of the M3/D and M9/D and the charging circuits of the M3/G and the M9/G, respectively, may be not provided.

By means of the above-mentioned circuit and the above-mentioned operation, the image signal Video can be converted to a line sequential current signal i(data).

The circuit configuration example of the column control circuit 19 adopts an analog system. When a digital system circuit is used, the image signal Video becomes a plurality of data signals, and the sample hold circuit 35 becomes a master slave flip-flop group to hold each data signal. The sample hold circuit 35 outputs a plurality of voltage signals V(data). The voltage-current conversion circuit becomes a current-output type digital-to-analog (DA) converter based on a weighted current corresponding to each voltage signal for determining a gm characteristic.

Next, the pixel circuits 20 of the display apparatus according to the present invention will be described. In the present invention, each of the pixel circuits 20 is provided with active elements, and is driven in a current setting system. Preferably, each pixel circuit 20 includes an EL element. Moreover, as the active elements, one or more TFT's are used.

Figure 7:
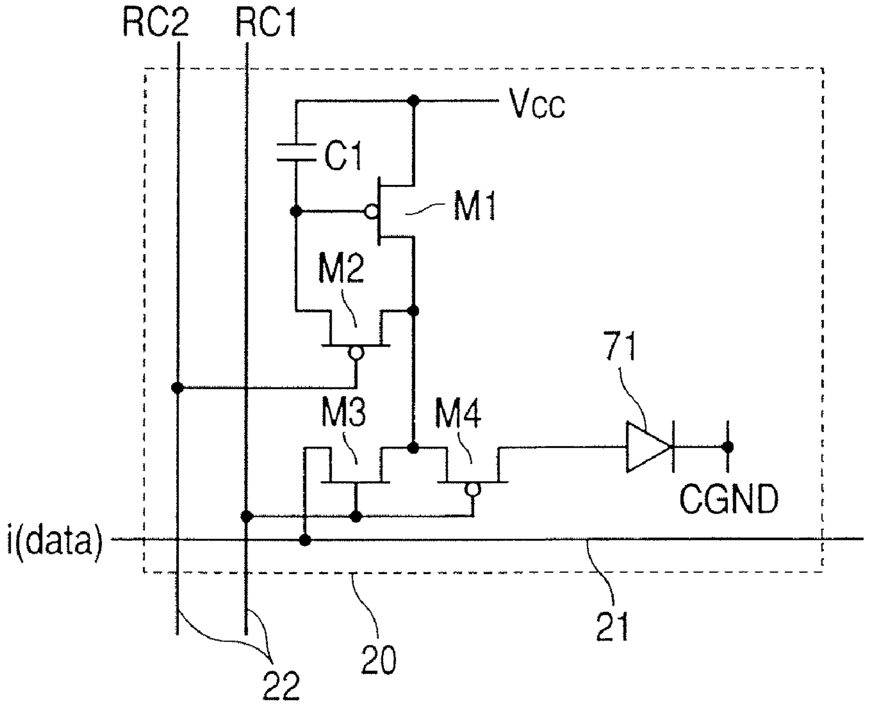
FIG. 7 is a diagram showing a circuit configuration of a pixel.

FIG. 7 shows a circuit configuration example of one of the pixel circuits 20. In FIG. 7, a reference numeral 71 designates an EL element. Reference marks M1, M2 and M4 severally designate a p-type TFT. A reference mark M3 designates an n-type TFT. A reference mark C1 designates capacity. Reference marks RC1 and RC2 severally designate a scanning signal. A reference mark Vcc designates a power source voltage.

In the pixel circuit 20 of FIG. 7, a data line 21 of the corresponding column is connected to an M3/S. One of scanning signal liens 22 of the corresponding row is connected to an M3/G, and a scanning signal RC1 is input into the M3/G. An M3/D is connected to an M4/S as well as an M2/D. The one of the scanning signal liens 22 of the corresponding row is also connected to an M4/G, and the scanning signal RC1 is input into the M4/G. An M1/S is connected to the power supply voltage Vcc. An M1/G is connected to one end of the capacity C1, the other end of which is connected to the power supply voltage Vcc, and an M2/S. An M2/G is connected to the other of the scanning signal lines 22 of the corresponding row, and the scanning signal RC2 is input into the M2/G. An M4/D is connected to a current injection terminal of the EL element 71, and the other end of the EL element 71 is grounded (GND).

Figure 8:
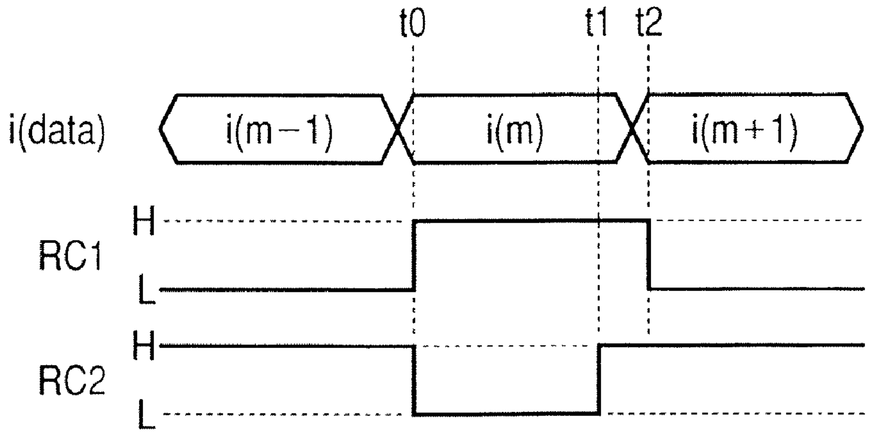
FIG. 8 is a time chart of the pixel circuit of FIG. 7.

The operation of the pixel circuit 20 of FIG. 7 will be described by reference to a time chart of FIG. 8.

A current signal i(data) to be input of the pixel circuits 20 of the corresponding column is input into the data line 21 of the column, being updated every row period.

At a time t0, the scanning signal RC1 of the corresponding row turns to "H", and the scanning signal RC2 turns to "L". Then, a voltage of the M1/G according to the current drive ability of the transistor M1 is generated by a current i(m) being the current i(data) at that point of time, and the capacity C1 is charged. At this time, the transistor M4 is off, and any currents are injected into the EL element 71.

At a time t1, the scanning signal RC2 changes to "H", and the transistor M2 turns off. Thereby, the voltage of the M1/G is held. At a time t2, the scanning signal RC1 changes to "L", and the transistor M4 turns on. Thereby, the current held by the transistor M1 is injected into the EL element 71, and the pixel circuit 20 is separated from the current signal i(data) to supply a current proportional to the set current signal i(m) to the EL element 71 continuously until the transistor M3 turned on next.

In the display apparatus of the present invention, the total sum current output circuit 13 is arranged between the column control circuits 19 and the pixel circuits 20 for correcting the dispersion of the current signals output from the column control circuits 19. From the total sum current output circuit 13, correcting routs are formed to perform correction.

Figure 9:
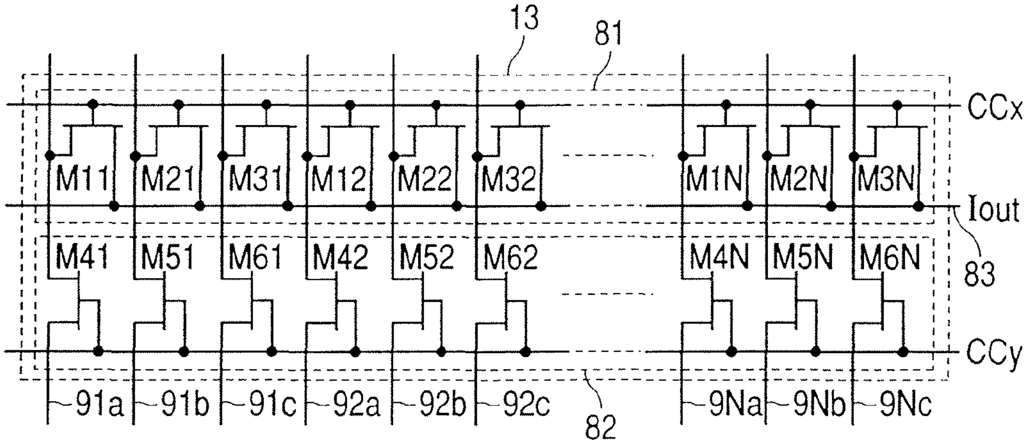
FIG. 9 is a diagram showing an example of the circuit configuration of a total sum current output circuit.

FIG. 9 shows an example of the circuit configuration of the total sum current output circuit 13 of the present embodiment. In FIG. 9, a reference numeral 83 designates a current signal output line to which the outputs of the current signal generation circuits 36 are commonly connected. A reference numeral 81 designates a switch unit for controlling the connection relations between the outputs of the current signal generation circuits 36 and the current signal output line 83. A reference numeral 82 designates a breaking unit being a switching unit for controlling the connection relations between the current signal generation circuits 36 and the pixel side. Reference numerals 91*a* to 9Nc designate data lines. Reference marks M11 to M3N and M41 to M6N designate transistors. A reference mark Iout designates a total sum current. Reference marks CCx and CCy designate total sum current detection control signals.

The total sum current output circuit 13 according to the present invention includes a switch unit 81 for outputting a current signal commonly from the plurality of data lines 21, and the breaking unit 82 for breaking the currents flowing to the pixel circuits 20. In the present embodiment, a form for outputting current signals from all of the data lines 21 is shown.

The switch unit 81 connects each of the data lines 91*a* to 9Nc (corresponding to the data liens 21 of FIG. 2) with the output line 83. The switch unit 81 is composed of a group of the transistors M11 to M3N being switches which can be freely controlled to be opened and closed. The breaking unit 82 is composed of a group of the breaking transistors M41 to M6N being switches which can be freely controlled to be opened and closed and connected to the data lines 91*a* to 9Nc between the switch unit 81 and the pixel circuits 20.

The data lines 91*a* to 9Nc connecting the column control circuits 19 severally to the corresponding pixel circuits 20 are severally connected to an M11/S to an M6N/S, and all of an M11/D to an M3N/D are commonly connected to the output line 83. Then, the total sum current Iout is output from the output line 83. On the other hand, an M41/D to an M6N/D are connected to the data lines 91*a* to 9Nc of the corresponding rows, respectively. All of an M11/G to an M3N/G are commonly connected, to which the total sum current detection control signal CCx from the logic circuit 23 is input. All of an M41/G to an M6N/G are commonly connected, to which the total sum current detection control signal CCy from the logic circuit 23 is input. Incidentally, all of the transistors perform switching operation, and by controlling appropriately, their types being n-types or p-types, and their configurations are not limited.

The operation of the total sum current output circuit 13 will be described on the basis of a time chart of FIG. 10. Incidentally, the case where the column control circuit 19 of FIG. 3 is used as those in FIG. 1 is exemplified, and all of the column control circuits 19 are supposed to be in the state of outputting currents by the column control signal CC3.

For performing the correction of an image signal by outputting a total sum current from the total sum current output circuit 13, a correction period is provided before a normal operation period. In the correction period, all of the transistors M11 to M3N of the switch unit 81 of the total sum current output circuit 13 are turned on by the total sum power detection control signal CCx, and all of the transistors M41 to M6N in the breaking unit 82 are turned off by the total sum power detection control signal CCy. Thereby, the current signals output from the column control circuits 19 do not flow through the pixel circuits 20, and all of the current signals are output from the output line 83.

Figure 4:
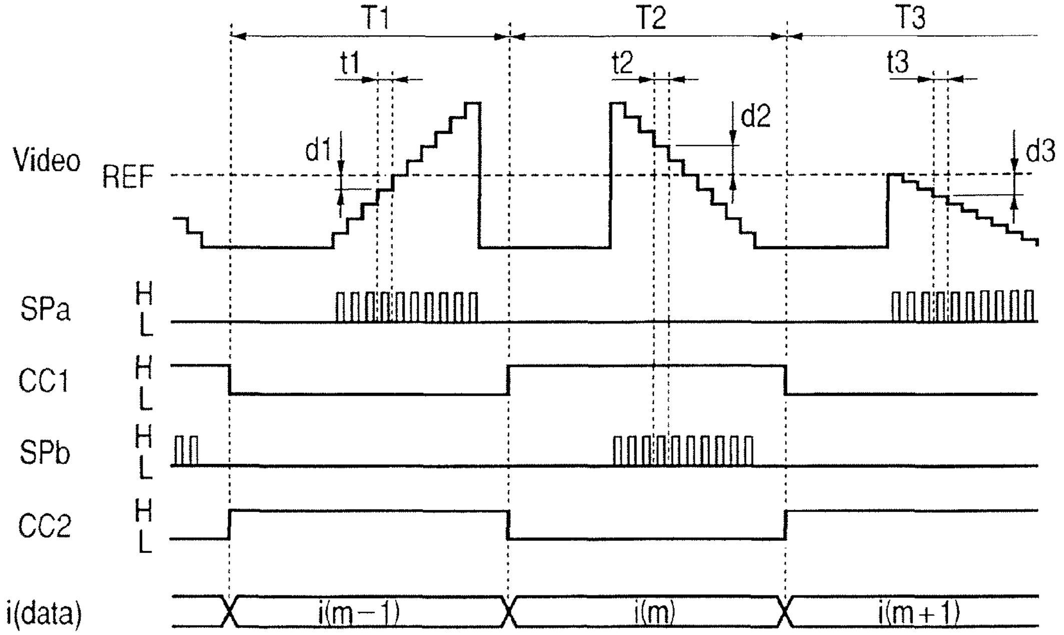
FIG. 4 is a time chart of the column control circuit of FIG. 3.

During the correction period, the timing of the sampling signals SPa and SPb, and the timing of the column control signals CC1 and CC2 are the same as ones of the normal operation shown in FIG. 4. However, the image signal Vide is set so that, for a horizontal scanning period, a first current signal is output only from a current signal generation circuit 36 for outputting a current signal to a predetermined data line 21, and that second current signals are output from the other current signal generation circuits 36 for outputting current signals to all of the other data lines 21. In each horizontal scanning period, the current signal generation circuit 36 for outputting the first current signal is set to be changed in order. To put it more concretely, for example, an image signal on which only one current signal generation circuit 36 outputs the first current signal having a predetermined level and the other current signal generation circuits 36 output the second current signals having levels lower than that of the first current signal is input into each of the current signal generation circuits 36. For example, when the current signal generation circuits 36 (the column control circuits 19) adopt a digital signal input system, and when the second currents are set to be zero, the digital data to be input into the current signal generation circuits 36 which are to output the second current signals may be set to be zero. In the image signal set as above, the first current signal is input into all of the data lines 21 in order for the horizontal period for the number of pixel columns. The control is performed by the control circuit 200 in FIG. 2. Corrections are performed during a correction period set by the control circuit 200. A configuration for performing the corrections by designating a correction period to the control circuit 200 from the outside may be adopted. Incidentally, as the second current signals, current signals having significant current values may be adopted. However, the current values of the second current signals are set to be almost zero hereupon. The setting makes later evaluation processing easy.

Figure 10:
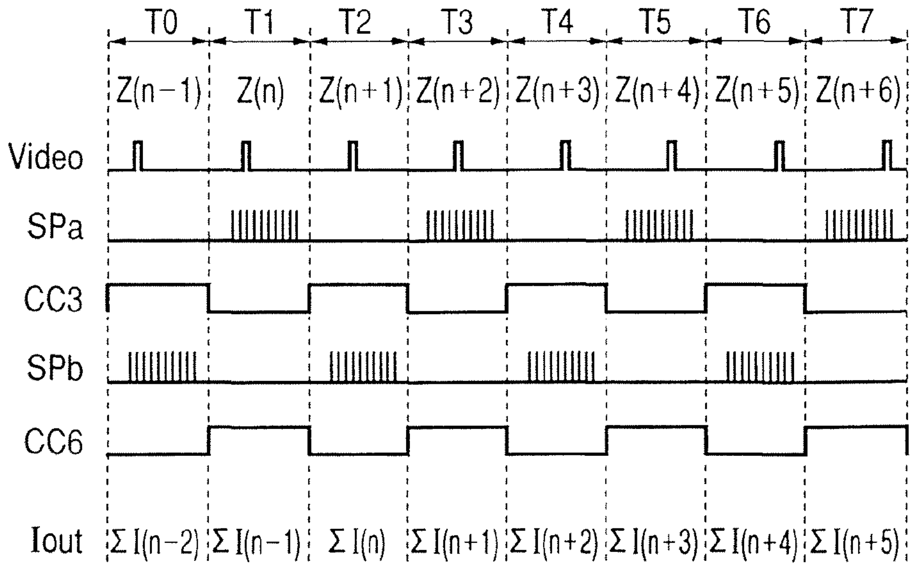
FIG. 10 is a time chart of the total sum current output circuit of FIG. 9.

In the time chart of FIG. 10, the image signal Video is set to have a waveform such that a high level signal is sampled only to one data line 21 in each of the horizontal scanning periods T0 to T7. Consequently, all of the column control circuits 19 samples the image signal Video by their normal operation, and output the current signals i(data). The current signals i(data) are output from the output line 83 by the total sum current output circuit 13 as the total sum current Iout of all of the data lines 21. The total sum current Iout to be output during each scanning period includes the output current from a data line 21 to which the first current signal is applied as a main component.

Incidentally, the data line 21 through which the first current signal is input during a row scanning period is not limited to one. The number of the data lines 21, through which the first current signal is input, for the minimum display unit may be adopted. The combination of data lines 21 to which the first current signal is input at the same time during a horizontal scanning period is suitably selected. By combining appropriate plural numbers of the data lines 21, the time necessary for the correction process can be shortened, and also the dispersion of TFT's to be visually noticeable can be extracted. Moreover, the data lines 21 included in a combination of each data line 21 may be overlapped to one another in different scanning periods, and also the order of the data lines 21 are not limited.

In the present embodiment, the total sum current detection circuit 2, the column current measurement circuit 3, the column current storage circuit 4, the reference column current detection circuit 5, the correction gain determination circuit 6, the correction factor calculation circuit 7 and the correction factor storage circuit 8 constitute a correction value output circuit for evaluating an output of a specific current signal generation circuit 36 on the basis of a current value to be output through the output line 83 to output a correction value according to the evaluation result. To put it concretely, the correction value output circuit is configured as follows. That is, the total sum current detection circuit 2 and the column current measurement circuit 3 evaluate an output of a current signal generation circuit 36, and the correction factor calculation circuit 7 calculate a correction value according to the evaluation result. Then, the correction factor storage circuit 8 being a correction value storage circuit stores the obtained correction value, and a correction value is output from the correction factor storage circuit 8.

The steps for evaluating an output of a current signal generation circuit 36 are performed as follows.

The total sum current Iout output from the total sum current output circuit 13 is output from the output terminal 27 of FIG. 2, and is input into the total sum current detection circuit 2. In the total sum current detection circuit 2, one end of the detection resistor 28 is connected to the output terminal 27. The other end of the detection resistor 28 is connected to the power source voltage Vcc. Moreover, the output terminal 27 is also connected to the positive pole side of the operational amplifier 16. The negative pole side and the output side of the operational amplifier 16 are shortened. The output terminal of the operational amplifier 16 is connected to the negative pole side of the comparator 17 in the column current measurement circuit 3 at the next stage. The output of the DAC 18 is input into the positive pole side of the comparator 17.

As for the total sum current to be detected during a correction period, because, for example, the currents corresponding to the voltages Vgs of the transistors M3 and M9 in the column control circuit 19 of FIG. 5 correspond to all column currents to flow through the detection resister 28 from the power source as the total sum current ΣI during the period in which the TEST signal to be input into the total sum current output circuit 13 is "H", the potential of the output terminal 27 becomes Vout=Vcc−ΣI×Rm (Rm designates the resistance value of the detection resister 28). Incidentally, the influence of the input impedance of the operational amplifier 16 is supposed to be neglected. The potential Vout is buffered to be input into the negative pole side of the comparator 17 as it is, owing to the structure of the operational amplifier 16.

Next, in FIG. 2, as the column measurement circuit 3, a sequential comparison circuit composed of the comparator 17, the DAC 18 and the comparison circuit 29 is shown. Because the sequential comparison circuit is popular and is widely used, the description thereof will be simplified.

The output of the comparator 17 is a digital output composed of two poles of "H" and "L". The comparison circuit 29 compares the potential Vout with the output value Vdac of the DAC 18 to judge the output level of the comparator 17. For example, when the output voltage of the DAC 18 is raised from the lowest potential by every resolution of a bit, the output of the comparator 17 is "L" during Vout>Vdac in the configuration shown in FIG. 2. When the situation changes to Vout<Vdac and the output of the comparator 17 is inverted to "H", the digital data of the DAC 18 is stored in the column current storage circuit 4. In FIG. 2, the potential Vout is input into the negative pole side of the comparator 17. However, the polarity may be exchanged for the polarity on the DAC 18 side. In this case, the output of the comparator 17 is also inverted. The values output from the comparator 29 are the evaluation values of the outputs of the current signal generation circuits. The evaluation values correspond to the current values output from the current signal generation circuits one to one.

The reference column current detection circuit 5 selects the current signal data to be a reference from the current signal data on each data line 21 stored in the column current storage circuit 4 to store the selected current signal data therein. The selection standard of the current signal data to be the reference has no particular limitations.

The correction factor calculation circuit 7 performs the calculation processing of the reference current signal data stored in the reference column current detection circuit 5 and the current signal data on each data line 21 stored in the column current storage circuit 4 to calculate a correction factor corresponding to each data line 21. To put it concretely, a gain calculation circuit is provided to the correction factor calculation circuit 7, and the gain calculation circuit performs the following calculations. That is, the reference current is divided by the current signal data on the data line 21 to be corrected. A square root calculation of the division result is performed. The result of the square root calculation is multiplied by a factor k. The obtained gain calculation result is used as the correction factor. Namely, the correction factor is calculated in accordance with the following formula (1).

$$Hsample = 1 - \left(1 - \sqrt{\frac{Iref}{Isample}}\right) \times k \tag{1}$$

where Hsample designates a correction factor of each data line 21, Isample designates current signal data of each data line 21, Iref designates reference current signal data, and k designates a factor.

In the above formula (1), when the square root calculation is performed by logic calculations, an approximation calculation based on a binomial theorem in which factors are classified is performed according to the divided value x=Iref/Isample for perform the calculation so that minimum errors may be generated. The calculation formula is shown as the following formula (2)

$$\sqrt{x} = \{a-(a-x)\}^{1/2} = \sqrt{a}\left(1-\frac{a-x}{a}\right)^{1/2} \cong \sqrt{a}\left(1-\frac{a-x}{2\times a}\right) \quad (2)$$

In the above formula (2), a and $a^{1/2}$ are the classifying factors. Several patterns of the classifying factors are previously prepared. The nearer the value of the term (a−x)/a in the above formula (2) to zero, the less the errors of the calculation result are.

Figure 11:
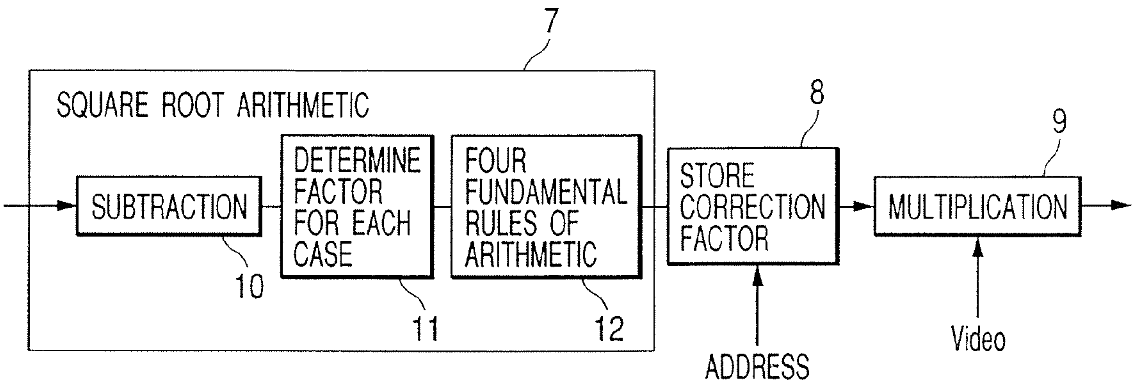
FIG. 11 is a diagram showing an example of the configuration of a correction factor calculation circuit.

FIG. 11 shows a configuration of the correction factor calculation circuit 7 of the present embodiment. In FIG. 11, a reference numeral 10 designates a division circuit. A reference numeral 11 designates a classification factor determination circuit. A reference numeral 12 designates four-fundamental rules of arithmetic circuit. In the present embodiment, the division value x=Iref/Isample is calculated on the basis of the currents Isample and Iref input into the division circuit 10, and the calculated division value x is input into the classification factor determination circuit 11. The classification factor determination circuit 11 determines the classification factors a and $a^{1/2}$ according to the division value x. The four-fundamental rules of arithmetic circuit 12 performs the calculation of the most right side of the above formula (2). Because the logics of the multiplications and divisions can be configured with general shifters and adders, the description of the operation of the logics are omitted here.

Figure 12:
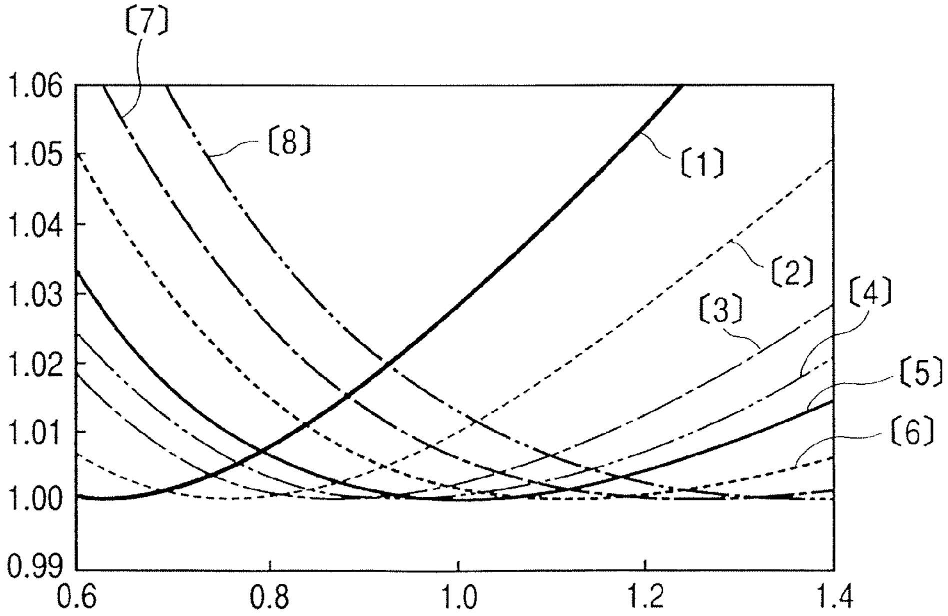
FIG. 12 is a graph showing calculation results by the correction factor calculation circuit.
Figure 13:
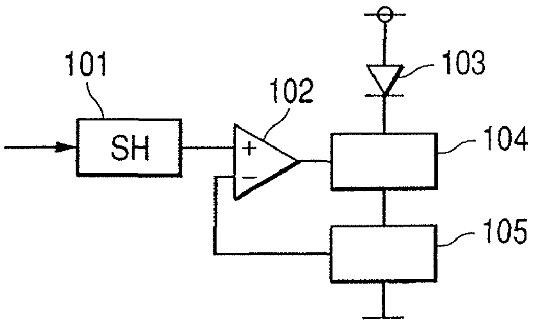
FIG. 13 is a diagram showing a pixel circuit of a conventional EL display apparatus.
Figure 14:
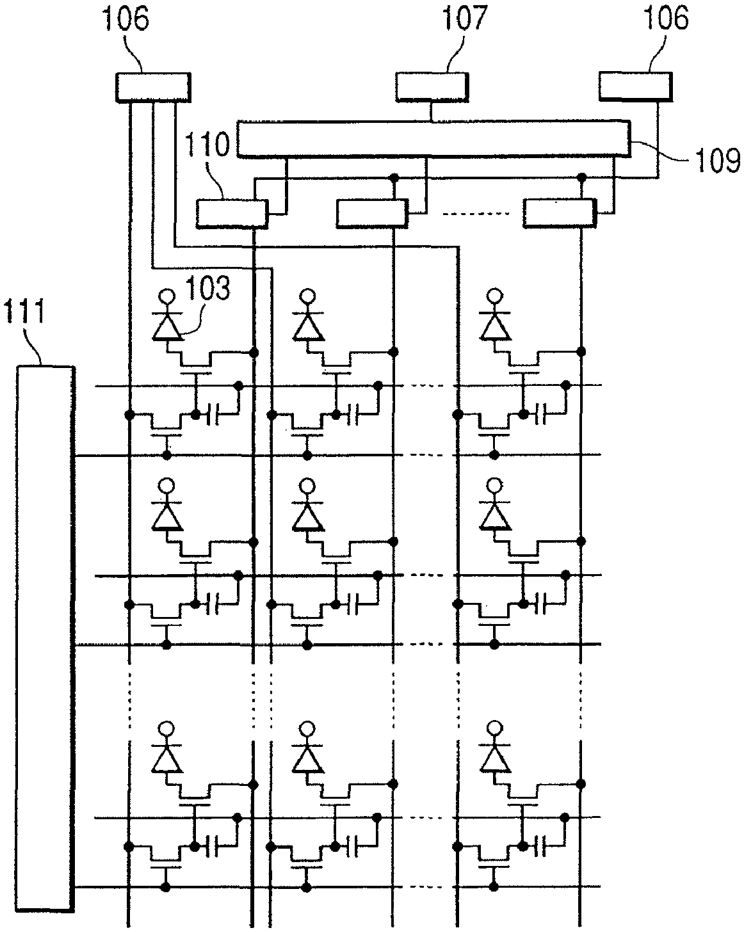
PRIOR ART FIG. 14
FIG. 14 is a diagram showing the configuration of a display panel of another convention EL display apparatus.

Actual calculation results of the above formula (2) are shown in FIG. 12. FIG. 12 shows the ratios of the results of the square root calculations by means of a calculator to those by means of the binomial theorem. The nearer the ratios are to one, the less the errors are. Eight combinations of the factors a and $a^{1/2}$ under the setting of the values to be calculated within a range from 0.5 to 1.5 are prepared. In the following, each combination is shown. Curves [1] to [8] shown in FIG. 12 severally show relations between ratios of exact calculation results (calculation results performed with an accurate calculator) to the results of the above approximation calculations (ordinate axis), and the above division values x (abscissa axis).

TABLE 1

| x | a | $\sqrt{a}$ |
|---|---|---|
| x < 0.69 | 0.6250 | 0.790569 |
| 0.69 ≦ x < 0.82 | 0.7500 | 0.866025 |
| 0.82 ≦ x < 0.91 | 0.8750 | 0.935414 |
| 0.91 ≦ x < 0.97 | 0.9375 | 0.968246 |
| 0.97 ≦ x < 1.07 | 1.0000 | 1.000000 |
| 1.07 ≦ x < 1.19 | 1.1250 | 1.06066 |
| 1.19 ≦ x < 1.32 | 1.2500 | 1.118034 |
| 1.32 ≦ x | 1.3750 | 1.172604 |

By selecting a factor nearer to one at a certain division value x on the graph of a curve of each value of a in order, calculation results which do not almost different from the results by means of the calculator can be obtained.

Thereby, the results obtained by the following calculations are the correction factors Hsample. That is, the calculation results obtained from the formula (2) are substituted for the value in the root symbol of the formula (1), and the substitution results are multiplied by the factor k. The thus obtained correction factors Hsample are stored in the correction factor storage circuit 8.

The image signal correction circuit 9 reads a correction factor of a column to be sampled, which is stored in the correction factor storage circuit 8, in accordance with the image signal Video of the column, and the image signal correction circuit 9 multiplies the image signal Video by the read correction signal to correct the image signal Video. The multiplication result is output according to the system of the column control circuit 19 concerning whether the column control circuit 19 adopts an analog system or a digital system. That is, in case of the digital system, the image signal correction circuit 9 outputs the corrected image signal to the drive circuit 1 as a digital signal. In case of the analog system, the analog voltage conversion of the corrected image signal is performed by the DAC 24 to be output to the drive control circuit 1 similarly.

The correction gain is determined by the value of the factor k in the formula (1). That is, when the factor k is set to be one, the value obtained by the division calculation and the root calculation is the correction factor Hsample as it is.

Because the gain of the correction factor Hsample is smaller than 1 in case of k<1, the correction is made to be weak. Consequently, the unevenness of current signals is not completely suppressed by one time of correction. Accordingly, the above correction process is performed by a plurality of times, and thereby the correction factor Hsample to be stored in the correction factor storage circuit 8 is gradually re-written to make it possible to suppress the unevenness of the current signals more surely.

In case of k>1, the correction is made to be strong conversely to the case of k<1. Consequently, there is some possibility that the unevenness of the current signals is reverse only by one time of correction. Accordingly, also in this case, the above correction process is performed by a plurality of times, and thereby the correction factor Hsample to be stored in the correction factor storage circuit 8 is gradually re-written to make it possible to suppress the unevenness of the current signals more surely.

Incidentally, when the gain is set to be too strong, there is some possibility of not converging contrariwise. The factor k is selected within a range of 1<k<2.

The gain may be selected on the basis of the condition of a device and a use of the time of mounting a product, and then the correction may be performed. For example, it is possible to correct the video signal Video by a gain set to be 1 before the lighting of the display panel at the starting of the product, and to correct the video signal Video a plurality of times by a gain set to be less than 1 or a gain set to be within a range of 1<k<2. The selection of the gain is performed by the correction gain determination circuit 6.

Incidentally, the correction period for determining the correction value may be set, for example, at the starting time of the product. Moreover, the correction period can be set to perform the correction at regular intervals. When a memory necessary for power supply for its storage holding operation is used as the correction factor storage circuit 8 being a circuit for storing correction values, the storage of the memory is lost by turning off the power source. Accordingly, the correction values may be determined every turning on the power source from the state of being off. Alternatively, by adopting a memory which does not lose its memory when its electric power is turned off (for example an electrically erasable programmable read-only memory (EEPROM)), a configuration in which the determination of the correction values at every turning on of the power source from the state of the power source being off is unnecessary can be realized.

(Embodiment 2)

In the above embodiment, the configuration for updating the correction value by obtaining the correction value during a previously set correction period has been described. In the present embodiment, a correction value determination process is performed only one time, and the correction value determined by the correction value determination process is used without updating it. To put it concretely, the correction value determination process is performed before shipping a product, and the obtained correction values are stored into the correction value output circuit. In this embodiment, because there is no necessity for updating the correction values, the memory which can be re-written is not needed to be used. This embodiment is not required to include, for a drive circuit or for a display apparatus, the control circuit 200 for controlling each of the plurality of current signal generating circuits to be the current signal outputting state capable of evaluating the output of a specific current signal generation circuit on the basis of the current value output through the current signal output line.

(Embodiment 3)

In the present embodiment, the step for evaluating the output of each current signal generation circuit, which has been described in the above-mentioned embodiments, is performed during the manufacturing process of a drive circuit and a display circuit or after the completion of the manufacturing process, and the judgment of inferior goods is performed. To put it concretely, when the dispersion of the outputs of respective current signal generation circuits is large, the manufacturing process after that or the shipping is stopped.

Incidentally, in each embodiment described above, an EL display apparatus using EL elements have been exemplified to be described. However, the present invention is not limited to use such an EL display apparatus. The present invention can be preferably applied to any apparatus capable of controlling the display of each pixel by a current signal.

According to the present invention, a drive circuit capable of performing evaluation with a simple structure can be realized.

What is claimed is:

1. An active matrix apparatus comprising:

a plurality of pixel circuits arranged in a matrix, each of the pixel circuits comprising an electroluminescent element, a thin film transistor for controlling light emission of the electroluminescent element, and a capacitor provided at a gate of the thin film transistor, to hold in the capacitor a voltage according to an input current signal and to emit light from the electroluminescent element based on the input current signal;

a plurality of analog current signal generation circuits each comprising a thin film transistor for converting an input analog video signal to generate the input current signal which each of the pixel circuits inputs through a data line;

a correction circuit for detecting the input current signal outputted though a signal output line from the plurality of analog current signal generation circuits, and for correcting, based on the detected current signal, the input analog video signal to be input into the analog current signal generation circuits;

a switch unit for controlling connection between the outputs of the current signal generation circuits and the current signal output line;

a breaking unit, arranged between the switch unit and the plurality of pixel circuits, for shutting down a current flowing from the current signal generation circuits into each of the pixel circuits; and a logic circuit for controlling connection between the switch unit and the braking unit, wherein during detecting the input current signal by the correction circuit, the logic circuit supplies the braking unit with a signal for shutting down the current flowing from the switch unit into the pixel circuits, and supplies the switch unit with a signal for connecting the outputs of the current signal generation circuits with the current signal output line.

2. An active matrix display apparatus comprising:

a plurality of pixel circuits arranged in a matrix, each of the pixel circuits comprising an electroluminescent element, a thin film transistor for controlling light emission of the electroluminescent element, and a capacitor provided at a gate of the thin film transistor, to hold in the capacitor a voltage according to an input current signal and to emit light from the electroluminescent element based on the input current signal;

a plurality of current signal generation circuits each comprising a thin film transistor for converting an input video signal to generate the input current signal which each of the pixel circuits inputs through a data line;

a correction circuit for detecting the input current signal outputted though a signal output line from the plurality of current signal generation circuits, and for correcting, based on the detected current signal, the input video signal to be input into the current signal generation circuits;

a shut down unit provided on the data line for shutting down a connection between the current signal generation circuit and the plurality of pixel circuits; and a switch unit for connecting the current signal generation circuits to the signal output line, wherein the shut down unit and the switch unit operate such that, during the detecting of the input current signal outputted through the signal output line from the plurality of current signal generation circuits, the connection between the current signal generation circuits and the plurality of pixel circuits is shut down, and the current signal generation circuit is connected to the signal output line.

* * * * *